(12) United States Patent
Lo

(10) Patent No.: US 8,928,968 B2
(45) Date of Patent: Jan. 6, 2015

(54) ELECTROPHORETIC DISPLAY PANEL AND MANUFACTURING METHOD THEREOF AND ELECTROPHORETIC DISPLAY APPARATUS

(71) Applicant: E Ink Holdings Inc., Hsinchu (TW)

(72) Inventor: Po-Yuan Lo, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 13/670,432

(22) Filed: Nov. 6, 2012

(65) Prior Publication Data
US 2013/0208340 A1 Aug. 15, 2013

(30) Foreign Application Priority Data
Feb. 10, 2012 (TW) .............................. 101104401 A

(51) Int. Cl.
G02B 26/00 (2006.01)

(52) U.S. Cl.
USPC ........................................................ 359/296

(58) Field of Classification Search
CPC .......... G02F 1/1167; G02F 2001/1678; G02F 1/133305; G02F 1/133514; G02F 1/1333; G09G 3/344
USPC ........... 359/227, 296; 349/33; 430/31–32, 34, 430/38; 204/450, 600; 250/208.1
See application file for complete search history.

(56) References Cited

U.S. PATENT DOCUMENTS

| 7,167,155 B1 | 1/2007 | Albert et al. |
| 2004/0072088 A1* | 4/2004 | Yu ................................ 430/59.6 |
| 2010/0149478 A1* | 6/2010 | Lee et al. ....................... 349/144 |
| 2010/0156779 A1* | 6/2010 | Park et al. ...................... 345/107 |

OTHER PUBLICATIONS

Lo et al., "Flexible glass substrates for organic TFT active matrix electrophoretic displays", SID 2011, May 2011, p. 1-p. 2.

* cited by examiner

*Primary Examiner* — William Choi
*Assistant Examiner* — Sharrief Broome
(74) *Attorney, Agent, or Firm* — Jianq Chyun IP Office

(57) ABSTRACT

An electrophoretic display panel including a transparent substrate, an active element array, a protective layer, plural electrophoretic display media and a transparent conductive layer is provided. The transparent substrate has an upper surface, a lower surface, plural first cavities located on the upper surface and plural second cavities located on the lower surface. The active element array is disposed on the upper surface and covers the upper surface and the first cavities. The protective layer is disposed on the upper surface and covers at least the active element array. The electrophoretic display media and the transparent conductive layer are disposed on the lower surface. The electrophoretic display media and the active element array overlap in at least a portion of their orthographic projections on the upper surface of the transparent substrate. The electrophoretic display media are located between the transparent conductive layer and the lower surface of the transparent substrate.

9 Claims, 7 Drawing Sheets

ELECTROPHORETIC DISPLAY PANEL AND MANUFACTURING METHOD THEREOF AND ELECTROPHORETIC DISPLAY APPARATUS

CROSS-REFERENCE TO RELATED APPLICATION

This application claims the priority benefit of Taiwan application serial no. 101104401, filed on Feb. 10, 2012. The entirety of the above-mentioned patent application is hereby incorporated by reference herein and made a part of this specification.

BACKGROUND OF THE DISCLOSURE

1. Field of the Disclosure

The invention relates to a display panel and manufacturing method thereof and a display apparatus. More particularly, the invention relates to an electrophoretic display panel and manufacturing method thereof and an electrophoretic display apparatus.

2. Description of Related Art

With the development of flat panel displays, manufacturers aim at equipping future displays with features including lightness, thinness, and flexibility. Among the displays, an electrophoretic display has attracted great attention.

A method of manufacturing a conventional electrophoretic display panel includes first forming a transparent electrode layer and a wall structure on a substrate to define a plurality of micro-cup structures and then filling display media into the micro-cup structures to form a plurality of display unit cells. The display media have black electrophoresis buffer and a plurality of white charged particles. Next, a protective layer and an adhesion layer are sequentially formed on top of the micro-cup structures, and an active element array substrate is disposed on one side of the adhesion layer opposite to the protective layer, such that the two substrates are bonded together. At this time, a thickness of the entire electrophoretic display panel is 0.8 millimeters. When an electric field between each pixel electrode and the transparent electrode layer of the active element array substrate is changed, the white charged particles move upward or downward based on a direction of the electric field, and regions corresponding to each pixel display the black color or the white color respectively.

In addition, conventionally, to improve a display quality of the electrophoretic display panel and to expand its application scope, a color filter is added on the electrophoretic display panel. However, the color filter has to use optical glue or double-sided tape to be adhered to the electrophoretic display panel. Therefore, the filter adhered to the electrophoretic display panel also leads to the thickness of the electrophoretic display apparatus to increase. In addition, using optical glue or double-sided tape causes gaps formed between the electrophoretic display panel and the filter and thereby increasing the overall reflectivity loss of the electrophoretic display apparatus.

SUMMARY OF THE DISCLOSURE

The invention provides an electrophoretic display panel with a thinner thickness.

The invention provides a method of manufacturing an electrophoretic display panel for manufacturing the aforesaid electrophoretic display panel.

The invention provides an electrophoretic display apparatus with a better display quality.

The invention proposes a method of manufacturing an electrophoretic display panel. The method includes following steps. A transparent substrate is provided. The transparent substrate has an upper surface, a lower surface opposite to the upper surface, a plurality of first cavities located on the upper surface and a plurality of second cavities located on the lower surface. An active element array is formed on the upper surface of the transparent substrate, wherein the active element array covers the upper surface and the first cavities. A protective layer is formed on the upper surface of the transparent substrate, wherein the protective layer covers at least the active element array. A plurality of electrophoretic display media are disposed on the lower surface of the transparent substrate, wherein the electrophoretic display media and the active element array overlap in at least a portion of their orthographic projections on the upper surface of the transparent substrate. A transparent conductive layer is formed on the lower surface of the transparent substrate, wherein the electrophoretic display media are located between the transparent conductive layer and the lower surface of the transparent substrate.

In an embodiment of the invention, the transparent substrate is a flexible substrate, and a thickness of the transparent substrate is less than 100 micrometers.

In an embodiment of the invention, the first cavities and the second cavities are opposite to one another, and each of the first cavities and the corresponding second cavity are separated from each other by a distance less than 80 micrometers.

In an embodiment of the invention, a diameter of each of the first cavities and a diameter of each of the second cavities are between 0.1 to 800 micrometers.

In an embodiment of the invention, the electrophoretic display media are located in the second cavities, and the transparent conductive layer covers the electrophoretic display media and the lower surface of the transparent substrate.

In an embodiment of the invention, the active element array includes a plurality of scan lines, a plurality of data lines and a plurality of active devices. The scan lines are intersected with the data lines. Each of the active devices is connected to the corresponding scan line and the corresponding data line. Each of the active devices includes a gate, a gate insulation layer covering the gate, a semiconductor channel layer disposed on the gate insulation layer, a drain, a source and an ohmic contact layer disposed between the source and the semiconductor channel layer and disposed between the drain and the semiconductor channel layer, and a portion of the drain extends to cover the first cavity nearby.

In an embodiment of the invention, the method of manufacturing the electrophoretic display panel further includes: performing an etching process to the lower surface of the transparent substrate before disposing the electrophoretic display media on the lower surface of the transparent substrate, so that the second cavities are linked to the first cavities and expose the portions of the drains located in the first cavities. A conductive layer is formed on the lower surface of the transparent substrate, wherein the conductive layer covers the lower surface and the exposed portions of the drains and exposes a portion of the lower surface. The electrophoretic display media are disposed on the lower surface of the transparent substrate, wherein the electrophoretic display media are located on the conductive layer. An insulation layer is formed on the lower surface of the transparent substrate, wherein the insulation layer covers the electrophoretic display media, the conductive layer, and the portion of the lower surface of the transparent substrate exposed by the conductive layer. The transparent conductive layer is formed on the lower surface of the transparent substrate, wherein the transparent conductive layer covers the insulation layer, and the electrophoretic display media are located between the transparent conductive layer and the conductive layer.

In an embodiment of the invention, a diameter of each of the first cavities and a diameter of each of the second cavities are between 0.1 to 800 micrometers.

In an embodiment of the invention, each of the electrophoretic display media includes a white and red capsule, a white and green capsule, a white and blue capsule, a white and yellow capsule, a black and red capsule, a black and green capsule, a black and blue capsule, a black and yellow capsule, or a black and white capsule.

The invention proposes an electrophoretic display panel including a transparent substrate, an active element array, a protective layer, a plurality of electrophoretic display media and a transparent conductive layer. The transparent substrate has an upper surface, a lower surface opposite to the upper surface, a plurality of first cavities located on the upper surface and a plurality of second cavities located on the lower surface. The active element array is disposed on the upper surface of the transparent substrate, wherein the active element array covers the upper surface and the first cavities. The protective layer is disposed on the upper surface of the transparent substrate, wherein the protective layer covers at least the active element array. The electrophoretic display media are disposed on the lower surface of the transparent substrate, wherein the electrophoretic display media and the active element array overlap in at least a portion of their orthographic projections on the upper surface of the transparent substrate. The transparent conductive layer is disposed on the lower surface of the transparent substrate, and the electrophoretic display media are located between the transparent conductive layer and the lower surface of the transparent substrate.

In an embodiment of the invention, the transparent substrate is a flexible substrate, and a thickness of the transparent substrate is less than 100 micrometers.

In an embodiment of the invention, the first cavities and the second cavities are opposite to one another, and each of the first cavities and the corresponding second cavity are separated from each other by a distance less than 80 micrometers.

In an embodiment of the invention, a diameter of each of the first cavities and a diameter of each of the second cavities are between 0.1 to 800 micrometers.

In an embodiment of the invention, the electrophoretic display media are located in the second cavities, and the transparent conductive layer covers the electrophoretic display media and the lower surface of the transparent substrate.

In an embodiment of the invention, the active element array includes a plurality of scan lines, a plurality of data lines and a plurality of active devices. The scan lines are intersected with the data lines. Each of the active devices is connected to the corresponding scan line and the corresponding data line. Each of the active devices includes a gate, a gate insulation layer covering the gate, a semiconductor channel layer disposed on the gate insulation layer, a drain, a source and an ohmic contact layer disposed between the source and the semiconductor channel layer and disposed between the drain and the semiconductor channel layer, and a portion of the drain extends to cover the first cavity nearby.

In an embodiment of the invention, the electrophoretic display panel further includes a conductive layer and an insulation layer. The conductive layer is disposed on the lower surface of the transparent substrate, wherein the second cavities are linked to the first cavities and expose the portions of the drains located in the first cavities. The conductive layer covers the lower surface and the exposed portions of the drains and exposes a portion of the lower surface. The electrophoretic display media are located on the conductive layer. The insulation layer is disposed on the lower surface of the transparent substrate, wherein the insulation layer covers the electrophoretic display media, the conductive layer, and the portion of the lower surface of the transparent substrate exposed by the conductive layer. The electrophoretic display media are located between the transparent conductive layer and the conductive layer. The transparent conductive layer covers the insulation layer.

In an embodiment of the invention, a diameter of each of the first cavities and a diameter of each of the second cavities are between 0.1 to 800 micrometers.

In an embodiment of the invention, each of the electrophoretic display media includes a white and red capsule, a white and green capsule, a white and blue capsule, a white and yellow capsule, a black and red capsule, a black and green capsule, a black and blue capsule, a black and yellow capsule, or a black and white capsule.

The invention proposes an electrophoretic display apparatus including an electrophoretic display panel, a light guiding plate, an adhesion layer and a light source. The electrophoretic display panel includes a transparent substrate, an active element array, a protective layer, a plurality of electrophoretic display media and a transparent conductive layer. The transparent substrate has an upper surface, a lower surface opposite to the upper surface, a plurality of first cavities located on the upper surface and a plurality of second cavities located on the lower surface. The active element array is disposed on the upper surface of the transparent substrate, wherein the active element array covers the upper surface and the first cavities. The protective layer is disposed on the upper surface of the transparent substrate, wherein the protective layer covers at least the active element array. The electrophoretic display media are disposed on the lower surface of the transparent substrate, wherein the electrophoretic display media and the active element array overlap in at least a portion of their orthographic projections on the upper surface of the transparent substrate. The transparent conductive layer is disposed on the lower surface of the transparent substrate, wherein the electrophoretic display media are located between the transparent conductive layer and the lower surface of the transparent substrate. The light guiding plate is disposed on the electrophoretic display panel. The adhesion layer is disposed between the light guiding plate and the electrophoretic display panel, wherein the light guiding plate is fixed on the transparent conductive layer of the electrophoretic display panel through the adhesion layer. The light source is disposed beside the light guiding plate.

In an embodiment of the invention, the light source includes a light emitting diode.

Based on the above, a design of the electrophoretic display panel of the invention is to dispose the active element array on the upper surface of the transparent substrate and to dispose the electrophoretic display media on the lower surface of the transparent substrate and to make the transparent substrate thinner through a design of cavity structures. Compared with a conventional electrophoretic display panel composed of two substrates bonded together, the electrophoretic display panel of the invention has a thinner thickness.

In order to make the aforementioned features and advantages of the invention more comprehensible, embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DETAILED DESCRIPTION OF THE EMBODIMENTS

Figure 1A:
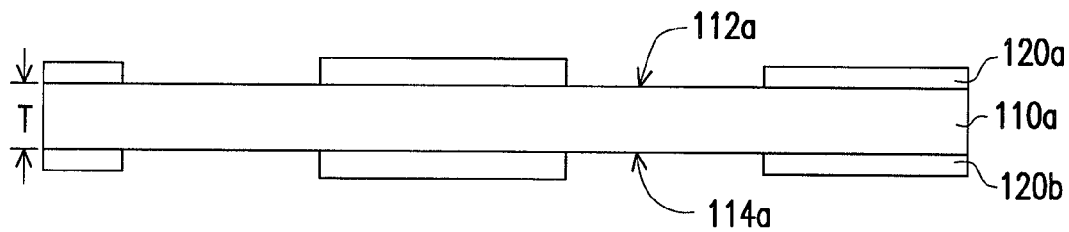
FIGS. 1A to 1F are schematic views of a method of manufacturing an electrophoretic display panel according to an embodiment of the invention.
Figure 1B:
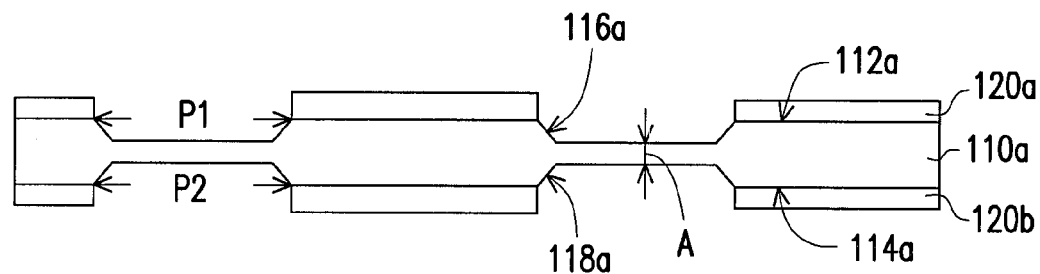
Figure 1C:
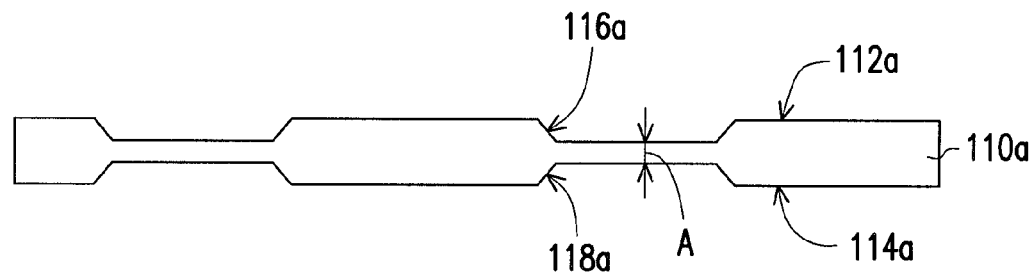
Figure 1D:
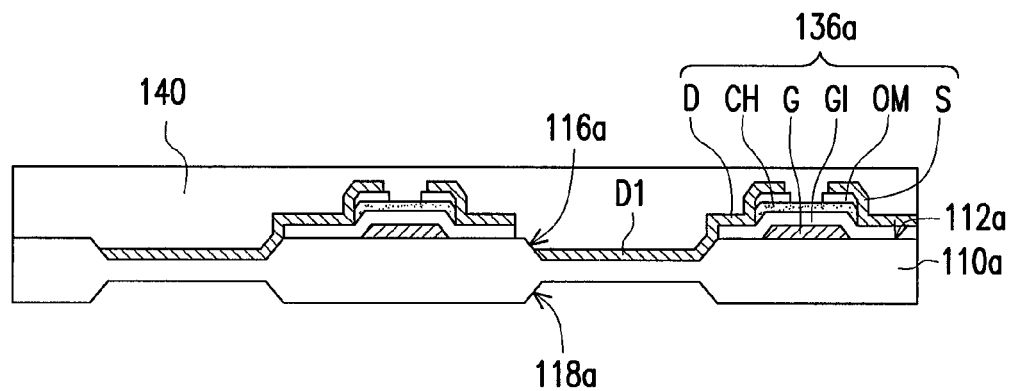
Figure 1E:
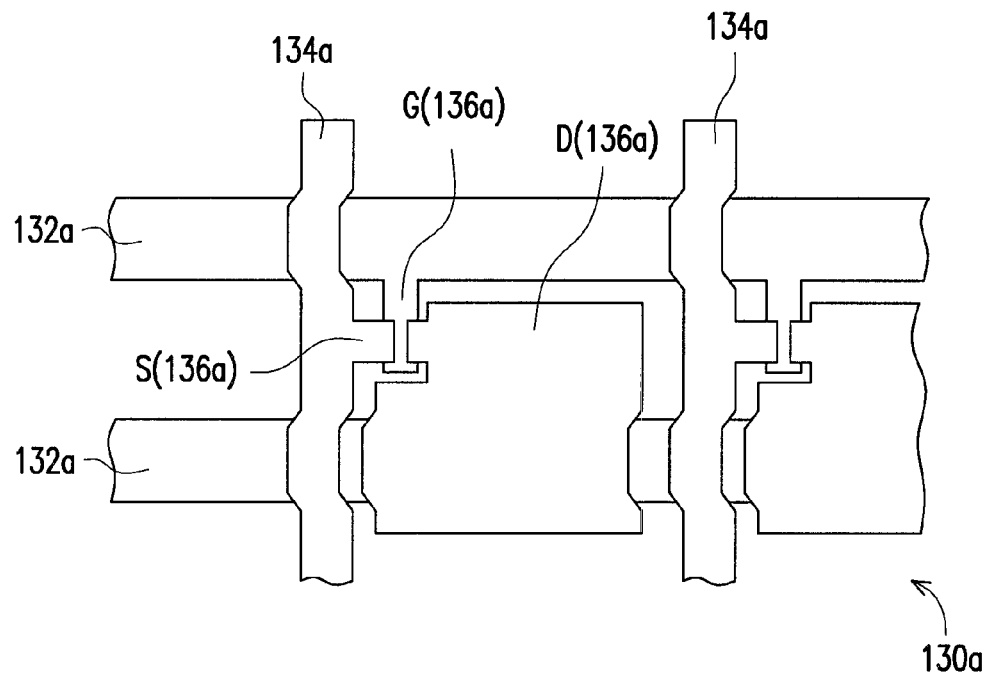

FIGS. 1A to 1F are schematic views of a method of manufacturing an electrophoretic display panel according to an embodiment of the invention. In order to facilitate description, FIGS. 1A, 1B, 1C, 1D and 1F are illustrated as cross-sectional views, and FIG. 1E is illustrated as a top view. Please refer to FIG. 1A. According to a method of manufacturing an electrophoretic display panel according to the present embodiment, first, a transparent substrate 110a is provided, wherein the transparent substrate 110a has an upper surface 112a and a lower surface 114a opposite to the upper surface 112a. A first patterned photoresist layer 120a and a second patterned photoresist layer 120b are formed on the upper surface 112a and the lower surface 114a, respectively. The first and the second patterned photoresist layers 120a and 120b expose a portion of the upper surface 112a and a portion of the lower surface 114a, respectively. Herein, the first and the second patterned photoresist layers 120a and 120b are formed by, for example, screen printing, gravure printing or offset printing to coat the photoresist layers on the upper surface 112a and the lower surface 114a of the transparent substrate 110a. Then, the first and the second patterned photoresist layers 120a and 120b are formed through exposure and development, wherein the first and the second patterned photoresist layers 120a and 120b may be manufactured and completed at the same time, or the second patterned photoresist layer 120b may be manufactured after the first patterned photoresist layer 120a is manufactured and completed, which is not limited herein. Herein, the transparent substrate 110a is, for example, a flexible substrate, and a material thereof is, for example, glass, but the invention is not limited thereto. Particularly, a thickness T of the transparent substrate 110a of the present embodiment is, for example, less than 100 micrometers.

Thereafter, please refer to FIG. 1B. With the first and the second patterned photoresist layers 120a and 120b as etching masks, the upper surface 112a and the lower surface and 114a of the transparent substrate 110a are etched to form a plurality of the first cavities 116a and a plurality of the second cavities 118a on the upper surface 112a and the lower surface 114a, respectively. Herein, depths of the first and the second cavities 116a and 118a are, for example, 0.1 millimeters or more, and the first and the second cavities 116a and 118a are opposite to one another. Particularly, each of the first cavities 116a and the corresponding second cavity 118a are separated from each other by a distance A which is, for example, less than 80 micrometers. In addition, a diameter P1 of each of the first cavities 116a and a diameter P2 of each of the second cavities 118a are between, for example, 0.1 to 800 micrometers. It should be noted that cross-sections of the first and the second cavities 116a and 118a illustrated in FIG. 1B are embodied as V-shaped-like linear cavities; however, in other embodiments, cross-sections of the first and the second cavities 116a and 118a may also be U-shaped cavities, rectangular cavities, or cavities with cross-sections of other appropriate shapes, which is not limited herein.

Thereafter, please refer to FIG. 1C. The first and the second patterned photoresist layers 120a and 120b are removed to expose the upper surface 112a and the lower surface 114a of the transparent substrate 110a. Thereby, the first and the second cavities 116a and 118a are formed on the upper surface 112a and the lower surface 114a of the transparent substrate 110a, and the purpose of making a portion of the transparent substrate 110a thinner is achieved.

Thereafter, please refer to both FIGS. 1D and 1E. An active element array 130a is formed on the upper surface 112a of the transparent substrate 110a, wherein the active element array 130a covers the upper surface 112a and the first cavities 116a. In more detail, the active element array 130a includes a plurality of scan lines 132a, a plurality of data lines 134a and a plurality of active devices 136a. The scan lines 132a are intersected with the data lines 134a. Each of the active devices 136a is connected to the corresponding scan line 132a and the corresponding data line 134a. Each of the active devices 136a includes a gate G, a gate insulation layer GI covering the gate G, a semiconductor channel layer CH disposed on the gate insulation layer GI, a drain D, a source S and an ohmic contact layer OM disposed between the source S and the semiconductor channel layer CH and disposed between the drain D and the semiconductor channel layer CH. Herein, a portion D1 of the drain D extends to cover the first cavity 116a nearby.

In the present embodiment, the scan lines 132a and the data lines 134a are disposed crossing over one another. In other words, an extending direction of the data lines 134a is unparallel to that of the scan lines 132a. Preferably, the extending direction of the data lines 134a is perpendicular to that of the scan lines 132a. In addition, the scan lines 132a and the data lines 134a belong to different layers. Based on the concern for conductivity, the scan lines 132a and the data lines 134a are usually made of metal materials. However, the invention is not limited thereto. According to other embodiments, the scan lines 132a and the data lines 134a may be made of other conductive materials, such as alloy, metal nitride, metal oxide, metal oxynitride, stack layers of metal materials and other conductive materials or other appropriate materials. The gate G of the active device 136a is electrically connected to the scan lines 132a, and the source S of the active device 136a is electrically connected to the data lines 134a. The gate G is disposed on the upper surface 112a of the transparent substrate 110a, and the gate G and the scan lines 132a belong to the same layer, and a material of the gate G is identical or similar to that of the scan lines 132a. A material of the gate insulation layer GI is a dielectric material, such as silicon oxide, silicon nitride, silicon oxynitride or stack layers thereof. A material of the semiconductor channel layer CH is, for example, amorphous silicon, N-type heavily-doped amorphous silicon, polysilicon, MOS or other semiconductor materials. The source S and the drain D are disposed on the two sides of the semiconductor channel layer CH. A material of the ohmic contact layer OM is, for example, doped amorphous silicon.

Thereafter, please refer to FIG. 1D. A protective layer 140 is formed on the upper surface 112a of the transparent substrate 110a, wherein the protective layer 140 covers at least the active element array 130a, and a material of the protective layer 140 is, for example, an organic insulating material or a stack layer including an inorganic insulating material and an organic insulating material.

Figure 1F:
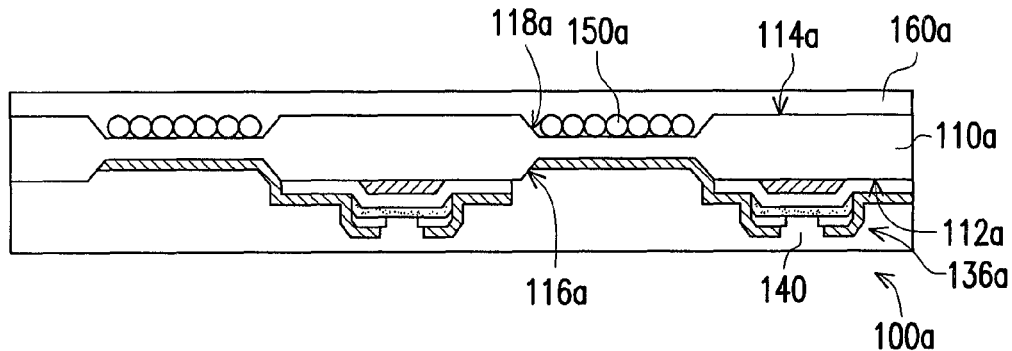

Thereafter, please refer to FIG. 1F. The transparent substrate 110a is turned over so that the lower surface 114a of the transparent substrate 110a faces upward, and a plurality of electrophoretic display media 150a are disposed on the lower surface 114a of the transparent substrate 110a. Particularly, the electrophoretic display media 150a of the present embodiment are located in the second cavities 118a of the transparent substrate 110a, wherein the electrophoretic display media 150a and the active element array 130a overlap in at least a portion of their orthographic projections on the upper surface 112a of the transparent substrate 110a. Herein, each of the electrophoretic display media 150a is, for example, a white and red capsule, a white and green capsule, a white and blue capsule, a white and yellow capsule, a black and red capsule, a black and green capsule, a black and blue capsule, a black and yellow capsule, or a black and white capsule.

Finally, please refer to FIG. 1F again. A transparent conductive layer 160a is formed on the lower surface 114a of the transparent substrate 110a, wherein the electrophoretic display media 150a are located between the transparent conductive layer 160a and the lower surface 114a of the transparent substrate 110a, and the transparent conductive layer 160a covers the electrophoretic display media 150a and the lower surface 114a of the transparent substrate 110a. Up to this point, the manufacture of the electrophoretic display panel 100a is completed.

Figure 2:
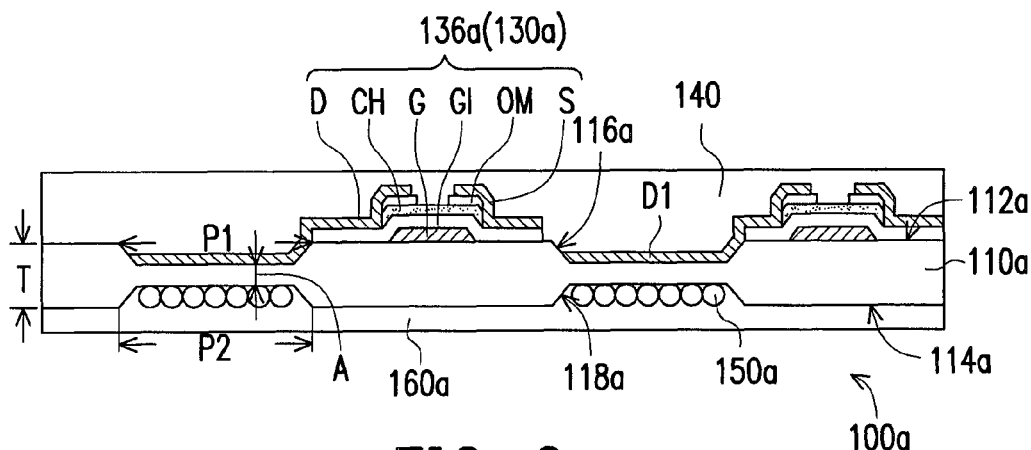
FIG. 2 is a schematic cross-sectional view of an electrophoretic display panel according to an embodiment of the invention.

FIG. 2 is a schematic cross-sectional view of an electrophoretic display panel according to an embodiment of the invention. For structure, please refer to FIG. 2. The electrophoretic display panel 100a of the present embodiment includes a transparent substrate 110a, an active element array 130a, a protective layer 140, a plurality of electrophoretic display media 150a and a transparent conductive layer 160a. The transparent substrate 110a has an upper surface 112a, a lower surface 114a opposite to the upper surface 112a, first cavities 116a on the upper surface 112a, and second cavities 118a on the lower surface 114a. Herein, the first cavities 116a and the second cavities 118a are opposite to one another, and each of the first cavities 116a and the corresponding second cavity 118a are separated from each other by a distance A which is, for example, less than 80 micrometers. A diameter P1 of each of the first cavities 116a and a diameter P2 of each of the second cavities 118a are between, for example, 0.1 to 800 micrometers. In addition, the transparent substrate 110a is, for example, a flexible substrate, and a thickness of the transparent substrate 110a is less than 100 micrometers. The active element array 130a is disposed on the upper surface 112a of the transparent substrate 110a, wherein the active element array 130a covers the upper surface 112a and the first cavities 116a, and the active element array 130a is composed of scan lines 132a (please refer to FIG. 1E), data lines 134a (please refer to FIG. 1E) and active devices 136a. The scan lines 132a are intersected with the data lines 134a, and each of the active devices 136a is connected to the corresponding scan line 132a and the corresponding data line 134a. Each of the active devices 136a includes a gate G, a gate insulation layer GI covering the gate G, a semiconductor channel layer CH disposed on the gate insulation layer GI, a drain D, a source S and an ohmic contact layer OM disposed between the source S and the semiconductor channel layer CH and disposed between the drain D and the semiconductor channel layer CH, and a portion D1 of the drain D extends to cover the first cavity 116a nearby. A protective layer 140 is disposed on the upper surface 112a of the transparent substrate 110a, wherein the protective layer 140 covers at least the active element array 130a. The electrophoretic display media 150a are disposed on the lower surface 114a of the transparent substrate 110a and located in the second cavities 118a, wherein the electrophoretic display media 150a and the active element array 130a overlap in at least a portion of their orthographic projections on the upper surface 112a of the transparent substrate 110a. Herein, each of the electrophoretic display media 150a is, for example, a white and red capsule, a white and green capsule, a white and blue capsule, a white and yellow capsule, a black and red capsule, a black and green capsule, a black and blue capsule, a black and yellow capsule, or a black and white capsule. A transparent conductive layer 160a is disposed on the lower surface 114a of the transparent substrate 110a, wherein the electrophoretic display media 150a are located between the transparent conductive layer 160a and the lower surface 114a of the transparent substrate 110a, and the transparent conductive layer 160a covers the electrophoretic display media 150a and the lower surface 114a of the transparent substrate 110a.

Since a design of the electrophoretic display panel 100a of the present embodiment is to dispose the active element array 130a on the upper surface 112a of the transparent substrate 110a and to dispose the electrophoretic display media 150a on the lower surface 114a of the transparent substrate 110a and to make the transparent substrate 110a thinner through designs of the first and the second cavities 116a and 118a, compared with a conventional electrophoretic display panel composed of two substrates bonded together, the electrophoretic display panel 100a of the present embodiment has a thinner thickness. Furthermore, since the electrophoretic display media 150a of the present embodiment are disposed in the second cavities 118a of the transparent substrate 110a, and the electrophoretic display media 150a and the active element array 130a overlap in at least a portion of their orthographic projections on the upper surface 112a of the transparent substrate 110a, the portion D1 of the drain D of the active devices 136a may drive the electrophoretic display media 150a through a transparent substrate 110a which has been made thinner and is located between the electrophoretic display media 150a and the portion D1 of the drain D (where the first and the second cavities 116a and 118a are located) to generate a white, black or colored display effect. Here, a driving voltage required by the electrophoretic display media 150a also decreases because of a design of the thinner transparent substrate 110a.

Figure 3:
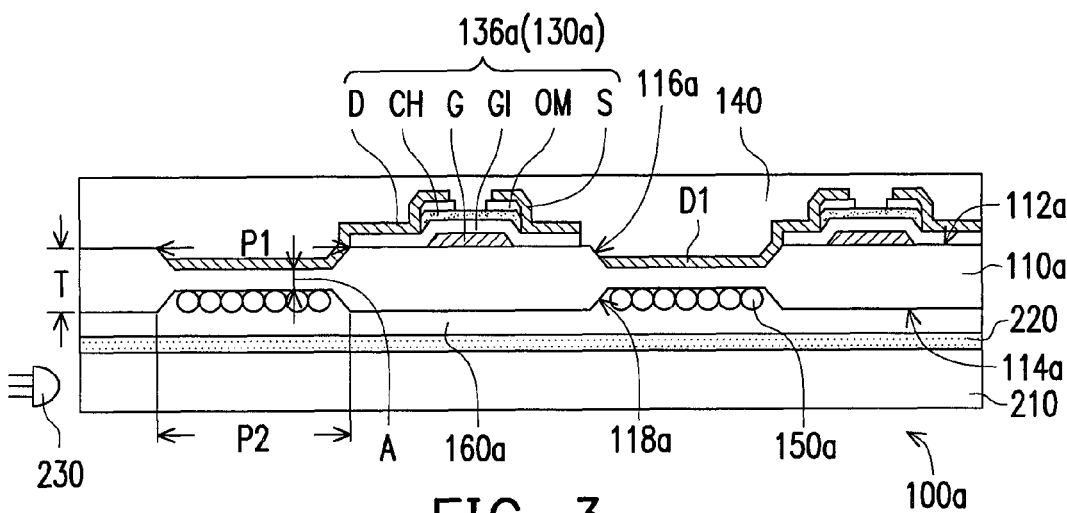
FIG. 3 is a schematic cross-sectional view of an electrophoretic display apparatus according to an embodiment of the invention.

FIG. 3 is a schematic cross-sectional view of an electrophoretic display apparatus according to an embodiment of the invention. Please refer to FIG. 3. An electrophoretic display apparatus 200a of the present embodiment includes an electrophoretic display panel 100a of the above-described embodiments, a light guiding plate 210, an adhesion layer 220 and a light source 230. Regarding the electrophoretic display panel 100a, please refer to the descriptions in the above-described embodiments; the detailed description of the electrophoretic display panel 100a is omitted. The light guiding plate 210 is disposed on the electrophoretic display panel 100a. The adhesion layer 220 is disposed between the light guiding plate 210 and the electrophoretic display panel 100a, wherein the light guiding plate 210 is fixed on the transparent conductive layer 160a of the electrophoretic display panel 100a through the adhesion layer 220. The light source 230 is disposed beside the light guiding plate 210, wherein the light source 230 is, for example, a light emitting diode.

Because the electrophoretic display panel 100a of the present embodiment is characterized in that it has a thinner thickness, when the light guiding plate 210 is disposed on the electrophoretic display panel 100a through the adhesion layer 220, and the light source 230 is disposed beside the light guiding plate 210, the electrophoretic display apparatus 200a with a front light source also has a thinner thickness, and designs of the light guiding plate 210 and the light source 230 also increase a display brightness of the reflective electrophoretic display panel 100a.

It should be noted that the following embodiments use the reference numerals and part of the contents of the above-described embodiments, wherein the same reference numerals are used for identical or similar components, and descriptions of identical technical contents are omitted. Please refer to the above-described embodiments for the descriptions omitted; in the following embodiments, repeated descriptions are omitted.

Figure 4A:
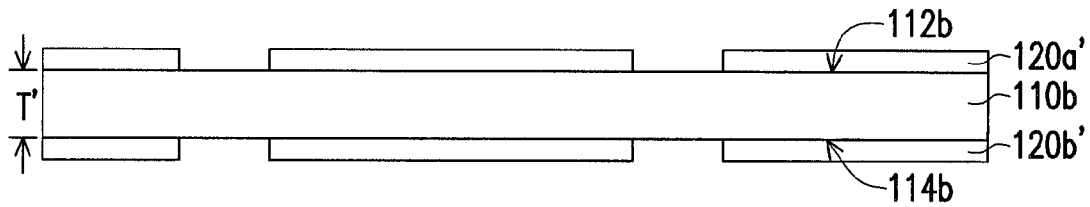
FIGS. 4A to 4H are schematic cross-sectional views of a method of manufacturing an electrophoretic display panel according to another embodiment of the invention.
Figure 4B:
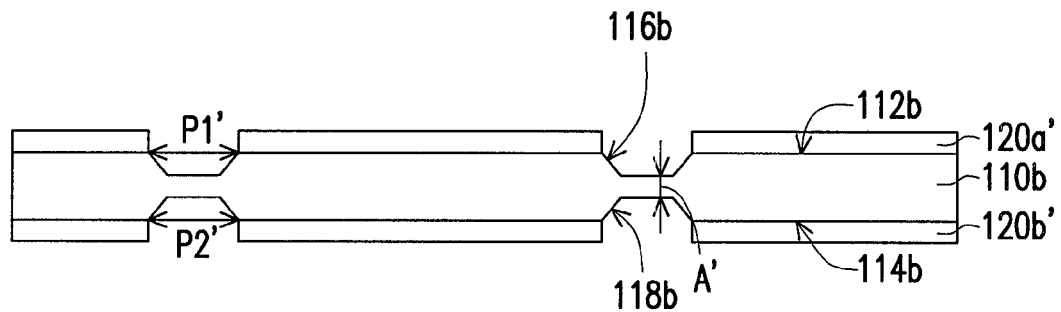
Figure 4C:
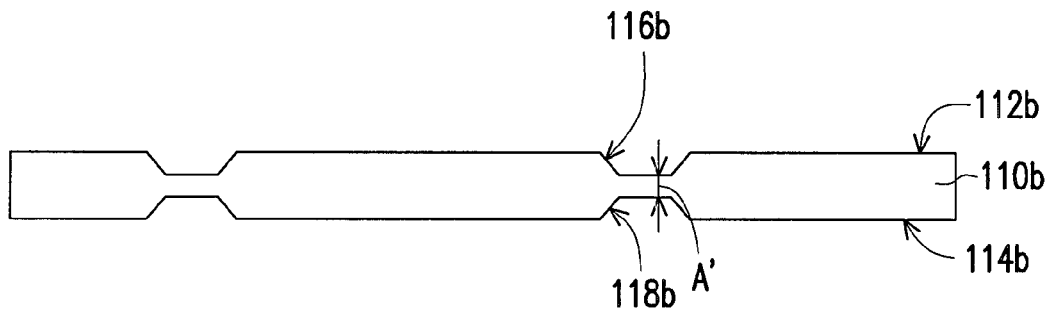
Figure 4D:
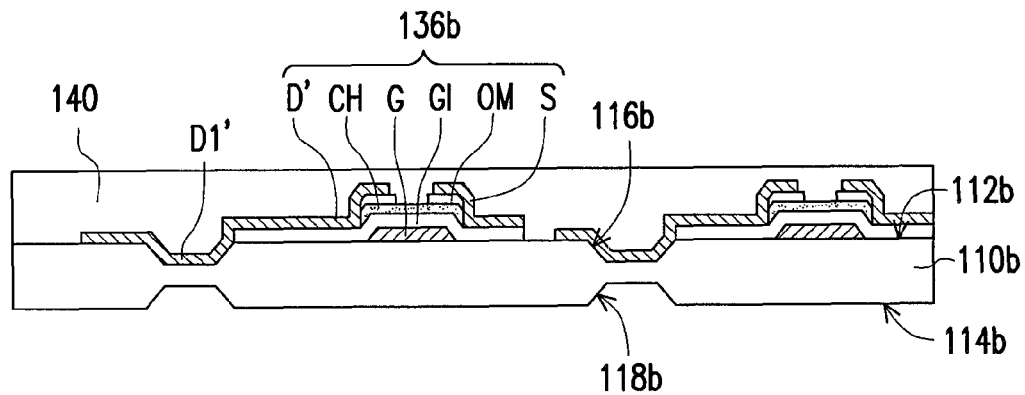
Figure 4E:
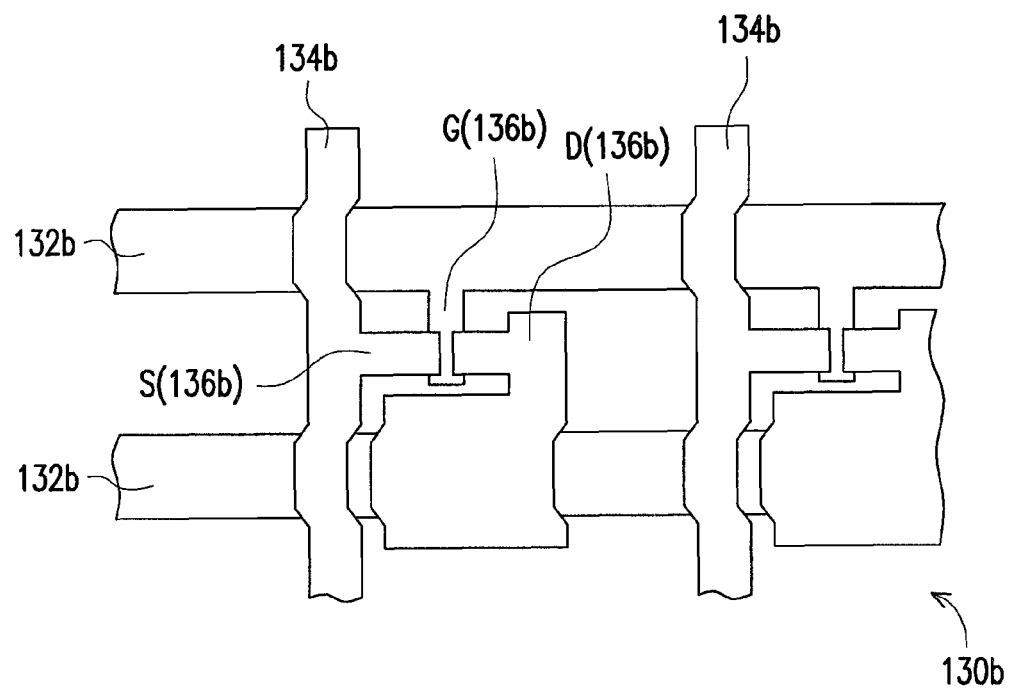

FIGS. 4A to 4H are schematic cross-sectional views of a method of manufacturing an electrophoretic display panel according to another embodiment of the invention. In order to facilitate description, FIGS. 4A, 4B, 4C, 4D, 4G and 4H are illustrated as cross-sectional views, and FIG. 4E is illustrated as a top view. Please refer to FIG. 4A. According to a method of manufacturing an electrophoretic display panel according to the present embodiment, first, a transparent substrate 110b is provided, wherein the transparent substrate 110b has an upper surface 112b and a lower surface 114b opposite to the upper surface 112b. A first patterned photoresist layer 120a' and a second patterned photoresist layer 120b' are formed on the upper surface 112b and the lower surface 114b, respectively. Herein, a way of forming the first and the second patterned photoresist layers 120a' and 120b' is the same as the way of forming the first and the second patterned photoresist layers 120a and 120b in the above-described embodiments, and a material of the transparent substrate 110b is the same as that of the transparent substrate 110a; therefore, the repeated descriptions are omitted. Particularly, a thickness T' of the transparent substrate 110b of the present embodiment is, for example, less than 100 micrometers.

Please refer to FIG. 4B. With the first and the second patterned photoresist layers 120a' and 120b' as etching masks, the upper surface 112b and the lower surface 114b of the transparent substrate 110b are etched to form a plurality of the first cavities 116b and a plurality of the second cavities 118b on the upper surface 112b and the lower surface 114b, respectively. Herein, depths of the first and the second cavities 116b and 118b are, for example, 0.1 millimeters or more, and the first and the second cavities 116b and 118b are opposite to one another. Particularly, each of the first cavities 116b and the corresponding second cavity 118b are separated from each other by a distance A' which is, for example, less than 80 micrometers. In addition, a diameter P1' of each of the first cavities 116b and a diameter P2' of each of the second cavities 118b are between, for example, 0.1 to 800 micrometers. It should be noted that cross-sections of the first and the second cavities 116b and 118b illustrated in FIG. 4B are embodied as V-shaped-like linear cavities; however, in other embodiments, cross-sections of the first and the second cavities 116b and 118b may also be U-shaped cavities, rectangular cavities, or cavities with cross-sections of other appropriate shapes, which is not limited herein.

Thereafter, please refer to FIG. 4C. The first and the second patterned photoresist layers 120a' and 120b' are removed to expose the upper surface 112b and the lower surface 114b of the transparent substrate 110b. Thereby, the first and the second cavities 116b and 118b are formed on the upper surface 112b and the lower surface 114b of the transparent substrate 110b, and the purpose of making a portion of the transparent substrate 110b thinner is achieved.

Thereafter, please refer to both FIGS. 4D and 4E. An active element array 130b is formed on the upper surface 112b of the transparent substrate 110b, wherein the active element array 130b covers the upper surface 112b and the first cavities 116b. In more detail, the active element array 130b includes a plurality of scan lines 132b, a plurality of data lines 134b and a plurality of active devices 136b. The scan lines 132b are intersected with the data lines 134b. Each of the active devices 136b is connected to the corresponding scan line 132b and the corresponding data line 134b. Each of the active devices 136b is similar to the active devices 136a in the above-described embodiments. Their only difference lies in that a portion D1' of the drain D' of the present embodiment extends to cover the first cavity 116b nearby and further extends from the first cavity 116b to cover the upper surface 112b of the transparent substrate 110b where another adjacent active device 136b is located.

Thereafter, please refer to FIG. 4D. A protective layer 140 is formed on the upper surface 112b of the transparent substrate 110b, wherein the protective layer 140 covers at least the active element array 130b, and a material of the protective layer 140 is, for example, an organic insulating material or a stack layer including an inorganic insulating material and an organic insulating material.

Figure 4F:
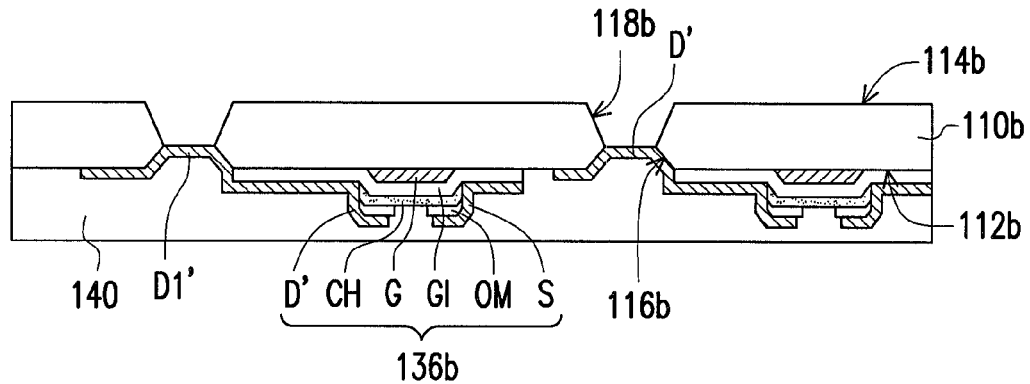

Thereafter, please refer to FIG. 4F. The transparent substrate 110b is turned over so that the lower surface 114b of the transparent substrate 110b faces upward, and an etching process is performed to the lower surface 114b of the transparent substrate 110b so that the second cavities 118b are linked to the first cavities 116b and expose the portion D1' of the drain D' located in the first cavities 116b.

Figure 4G:
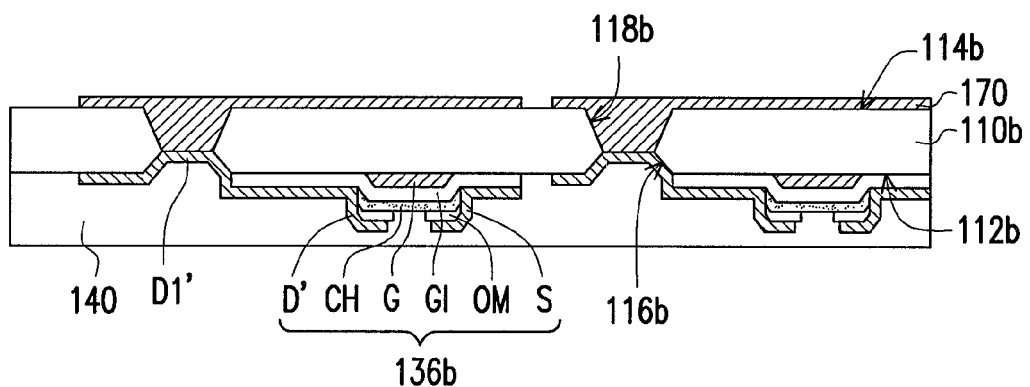

Thereafter, please refer to FIG. 4G. A conductive layer 170 is formed on the lower surface 114b of the transparent substrate 110b, wherein the conductive layer 170 covers the lower surface 114b and the exposed portion D1' of the drain D and exposes a portion of the lower surface 114b of the transparent substrate 110b. Herein, a material of the conductive layer 170 is, for example, a transparent conductive material or a non-transparent conductive material, which is not limited herein.

Figure 4H:
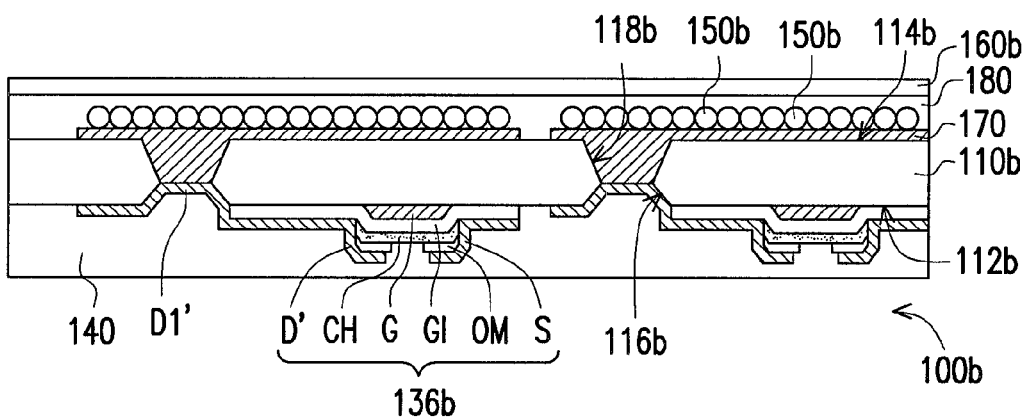

Thereafter, please refer to FIG. 4H. A plurality of electrophoretic display media 150b are disposed on the lower surface 114b of the transparent substrate 110b, wherein the electrophoretic display media 150b are located on the conductive layer 170, and the electrophoretic display media 150b and the active element array 130b overlap in at least a portion of their orthographic projections on the upper surface 112b of the transparent substrate 110b. Herein, each of the electrophoretic display media 150b is, for example, a white and red capsule, a white and green capsule, a white and blue capsule, a white and yellow capsule, a black and red capsule, a black and green capsule, a black and blue capsule, a black and yellow capsule, or a black and white capsule.

Thereafter, please refer to FIG. 4H again. An insulation layer 180 is formed on the lower surface 114b of the transparent substrate 110b, wherein the insulation layer 180 covers the electrophoretic display media 150b, the conductive layer 170, and the portion of the lower surface 114b of the transparent substrate 110b exposed by the conductive layer 170.

Finally, a transparent conductive layer 160b is formed on the lower surface 114b of the transparent substrate 110b, wherein the transparent conductive layer 160b covers the insulation layer 180, and the electrophoretic display media 150b are located between the transparent conductive layer 160b and the conductive layer 170. Up to this point, the manufacture of the electrophoretic display panel 100b is completed.

Figure 5:
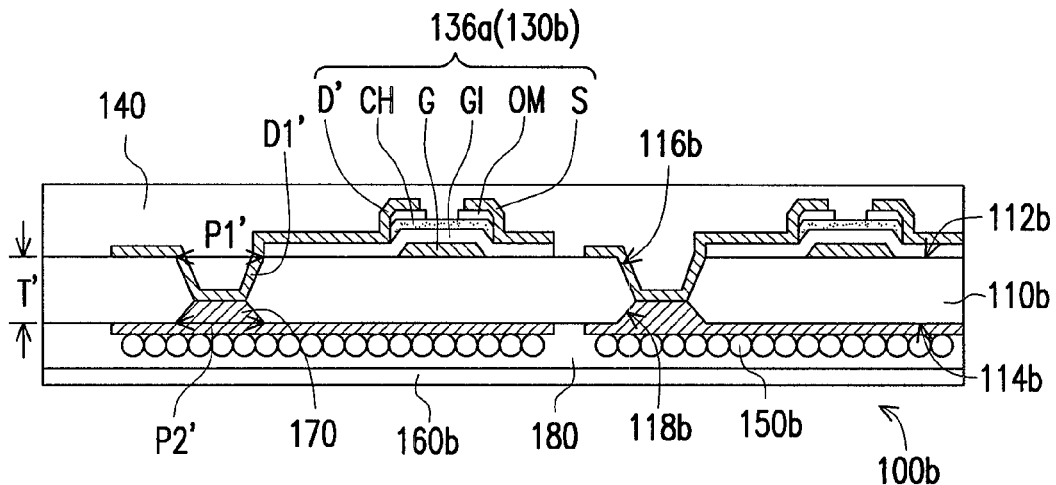
FIG. 5 is a schematic cross-sectional view of an electrophoretic display panel according to another embodiment of the invention.

FIG. 5 is a schematic top view of a portion of an electrophoretic display panel according to another embodiment of the invention. For structure, please refer to FIG. 5. The electrophoretic display panel 100b includes a transparent substrate 110b, an active element array 130b, a protective layer 140, a plurality of electrophoretic display media 150b, a transparent conductive layer 160b, a conductive layer 170, and an insulation layer 180. The transparent substrate 110b has an upper surface 112b, a lower surface 114b opposite to the upper surface 112b, first cavities 116b on the upper surface 112b, and second cavities 118b on the lower surface 114b. Herein, the first cavities 116b and the second cavities 118b are opposite to one another, and a diameter P1' of each of the first cavities 116b and a diameter P2' of each of the second cavities 118b are between 0.1 to 800 micrometers. In addition, the transparent substrate 110b is, for example, a flexible substrate, and a thickness of the transparent substrate 110b is less than 100 micrometers. The active element array 130b is disposed on the upper surface 112b of the transparent substrate 110b, wherein the active element array 130b covers the upper surface 112b and the first cavities 116b, and the active element array 130b is composed of scan lines 132b (please refer to FIG. 4E), data lines 134b (please refer to FIG. 4E) and active devices 136b. The scan lines 132b are intersected with the data lines 134b, and each of the active devices 136b is connected to the corresponding scan line 132b and the corresponding data line 134b. Each of the active devices 136b includes a gate G, a gate insulation layer GI covering the gate G, a semiconductor channel layer CH disposed on the gate insulation layer GI, a drain D', a source S and an ohmic contact layer OM disposed between the source S and the semiconductor channel layer CH and disposed between the drain D' and the semiconductor channel layer CH, and a portion D1' of the drain D' extends to cover the first cavity 116b nearby and further extends from this first cavity 116b to cover the upper surface 112b of the transparent substrate 110b where another adjacent active device 136b is located. The protective layer 140 is disposed on the upper surface 112b of the transparent substrate 110b, wherein the protective layer 140 covers at least the active element array 130b. The conductive layer 170 is disposed on the lower surface 114b of the transparent substrate 110b, wherein the second cavities 118b are linked to the first cavities 116b and expose the portion D r of the drain D' located in the first cavities 116b, and the conductive layer 170 covers the lower surface 114b of the transparent substrate 110b and the exposed portion Dr of the drain D and exposes a portion of the lower surface 114b. The electrophoretic display media 150b are disposed on the lower surface 114b of the transparent substrate 110b, wherein the electrophoretic display media 150b are located on the conductive layer 170, and the electrophoretic display media 150b and the active element array 130b overlap in at least a portion of their orthographic projections on the upper surface 112b of the transparent substrate 110b. Herein, each of the electrophoretic display media 150b is, for example, a white and red capsule, a white and green capsule, a white and blue capsule, a white and yellow capsule, a black and red capsule, a black and green capsule, a black and blue capsule, a black and yellow capsule, or a black and white capsule. The insulation layer 180 is disposed on the lower surface 114b of the transparent substrate 110b, wherein the insulation layer 180 covers the electrophoretic display media 150b, the conductive layer 170, and the portion of the lower surface 114b of the transparent substrate 110b exposed by the conductive layer 170. The transparent conductive layer 160b is disposed on the lower surface 114b of the transparent substrate 110b, wherein the transparent conductive layer 160b covers the insulation layer 180, and the electrophoretic display media 150b are located between the transparent conductive layer 160b and the conductive layer 170.

Since a design of the electrophoretic display panel 100b of the present embodiment is to dispose the active element array 130b on the upper surface 112b of the transparent substrate 110b and to dispose the electrophoretic display media 150b on the lower surface 114b of the transparent substrate 110b and to make the transparent substrate 110b thinner through designs of the first and the second cavities 116b and 118b, compared with a conventional electrophoretic display panel composed of two substrates bonded together, the electrophoretic display panel 100b of the present embodiment has a thinner thickness. Furthermore, in the present embodiment, by using the portion D1' of the drain D' in the first cavities 116b on the upper surface 112b of the transparent substrate 110b to be electrically connected to the conductive layer 170 on the lower surface 114b of the transparent substrate 110b, the electrophoretic display media 150b on the conductive layer 170 is driven to generate a white, black or colored display effect. Therefore, a driving voltage required by the electrophoretic display media 150b also decreases because of the design that the first and the second cavities 116b and 118b of transparent substrate 110b are linked together.

Figure 6:
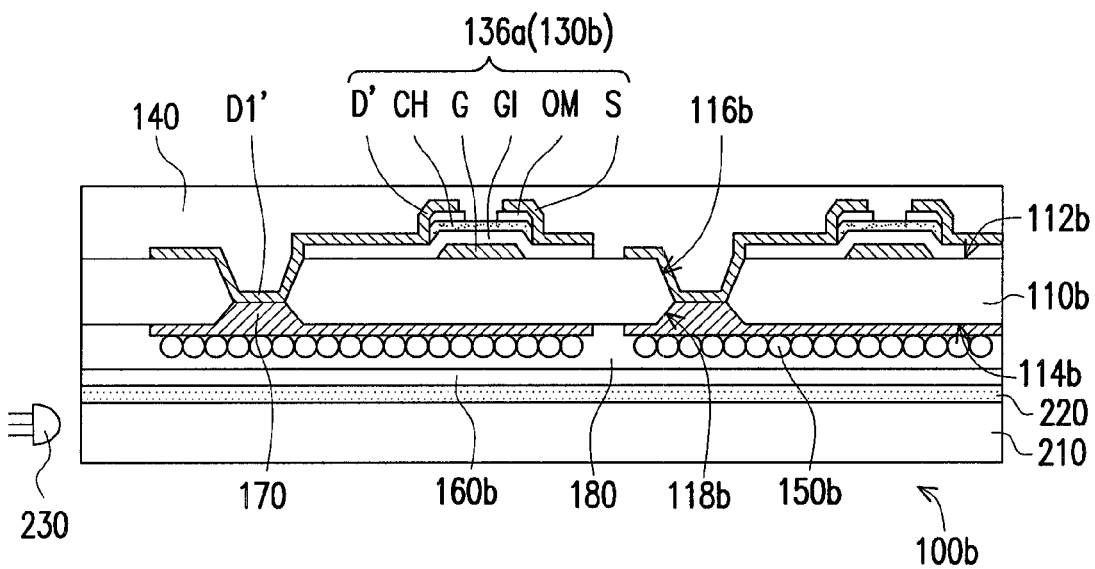
FIG. 6 is a schematic cross-sectional view of an electrophoretic display apparatus according to another embodiment of the invention.

FIG. 6 is a schematic cross-sectional view of an electrophoretic display apparatus according to another embodiment of the invention. Please refer to FIG. 6. An electrophoretic display apparatus 200b of the present embodiment includes the electrophoretic display panel 100b of the above-described embodiments, a light guiding plate 210, an adhesion layer 220 and a light source 230. Regarding the electrophoretic display panel 100b, please refer to the descriptions in the above-described embodiments; the detailed description of the electrophoretic display panel 100b is omitted. The light guiding plate 210 is disposed on the electrophoretic display panel 100b. The adhesion layer 220 is disposed between the light guiding plate 210 and the electrophoretic display panel 100b, wherein the light guiding plate 210 is fixed on the transparent conductive layer 160b of the electrophoretic display panel 100b through the adhesion layer 220. The light source 230 is disposed beside the light guiding plate 210, wherein the light source 230 is, for example, a light emitting diode.

Because the electrophoretic display panel 100b of the present embodiment is characterized in that it has a thinner thickness, when the light guiding plate 210 is disposed on the electrophoretic display panel 100b through the adhesion layer 220, and the light source 230 is disposed beside the light guiding plate 210, the electrophoretic display apparatus 200b with a front light source also has a thinner thickness, and designs of the light guiding plate 210 and the light source 230 also increase a display brightness of the reflective electrophoretic display panel 100b.

Based on the above, a design of the electrophoretic display panel of the invention is to dispose the active element array on the upper surface of the transparent substrate and to dispose the electrophoretic display media on the lower surface of the transparent substrate and to make the transparent substrate thinner through a design of cavity structures. Compared with a conventional electrophoretic display panel composed of two substrates bonded together, the electrophoretic display panel of the invention has a thinner thickness.

Although the invention has been disclosed with reference to the above embodiments, they are not intended to limit the invention. It will be apparent to one of ordinary skills in the art that variations and modifications may be made without departing from the spirit and scope of the invention. Accordingly, the scope of the invention will be defined by the appended claims.

What is claimed is:

1. An electrophoretic display panel, comprising:
   a transparent substrate having an upper surface, a lower surface opposite to the upper surface, a plurality of first cavities located on the upper surface and a plurality of second cavities located on the lower surface;
   an active element array disposed on the upper surface of the transparent substrate, wherein the active element array covers the upper surface and the first cavities;
   a protective layer disposed on the upper surface of the transparent substrate, wherein the protective layer covers at least the active element array;
   a plurality of electrophoretic display media disposed on the lower surface of the transparent substrate, wherein the electrophoretic display media and the active element array overlap in at least a portion of their orthographic projections on the upper surface of the transparent substrate; and
   a transparent conductive layer disposed on the lower surface of the transparent substrate, wherein the electrophoretic display media are located between the transparent conductive layer and the lower surface of the transparent substrate.

2. The electrophoretic display panel according to claim 1, wherein the transparent substrate is a flexible substrate, and a thickness of the transparent substrate is less than 100 micrometers.

3. The electrophoretic display panel according to claim 1, wherein the first cavities and the second cavities are opposite to one another, and each of the first cavities and the corresponding second cavity are separated from each other by a distance less than 80 micrometers.

4. The electrophoretic display panel according to claim 3, wherein a diameter of each of the first cavities and a diameter of each of the second cavities are between 0.1 to 800 micrometers.

5. The electrophoretic display panel according to claim 4, wherein the electrophoretic display media are located in the second cavities, and the transparent conductive layer covers the electrophoretic display media and the lower surface of the transparent substrate.

6. The electrophoretic display panel according to claim 1, wherein the active element array comprises a plurality of scan lines, a plurality of data lines and a plurality of active devices, the scan lines being intersected with the data lines, each of the active devices being connected to the corresponding scan line and corresponding data line, and each of the active devices comprising a gate, a gate insulation layer covering the gate, a semiconductor channel layer disposed on the gate insulation layer, a drain, a source and an ohmic contact layer disposed between the source and the semiconductor channel layer and disposed between the drain and the semiconductor channel layer, and a portion of the drain extending to cover the first cavity nearby.

7. The electrophoretic display panel according to claim 6, further comprising:
   a conductive layer disposed on the lower surface of the transparent substrate, wherein the second cavities are linked to the first cavities and expose the portions of the drains located in the first cavities, and the conductive layer covers the lower surface and the exposed portions of the drains and exposes a portion of the lower surface, and the electrophoretic display media are located on the conductive layer; and
   an insulation layer disposed on the lower surface of the transparent substrate, wherein the insulation layer covers the electrophoretic display media, the conductive layer, and the portion of the lower surface of the transparent substrate exposed by the conductive layer, and the electrophoretic display media are located between the transparent conductive layer and the conductive layer, and the transparent conductive layer covers the insulation layer.

8. The electrophoretic display panel according to claim 7, wherein a diameter of each of the first cavities and a diameter of each of the second cavities are between 0.1 to 800 micrometers.

9. The electrophoretic display panel according to claim 1, wherein each of the electrophoretic display media comprises a white and red capsule, a white and green capsule, a white and blue capsule, a white and yellow capsule, a black and red capsule, a black and green capsule, a black and blue capsule, a black and yellow capsule, or a black and white capsule.

* * * * *